US012252016B2

(12) United States Patent
Heukelbach et al.

(10) Patent No.: US 12,252,016 B2
(45) Date of Patent: Mar. 18, 2025

(54) HYBRID DRIVE SYSTEM FOR A MOTOR VEHICLE

(71) Applicant: Mercedes-Benz Group AG, Stuttgart (DE)

(72) Inventors: Kai Heukelbach, Koengen (DE); Bernd Koppitz, Winterbach (DE); Bernhard Ziegler, Rechberghausen (DE); Jan Velthaus, Stuttgart (DE); Lukas Rube, Pluederhausen (DE); Thomas Lechthaler, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/294,440

(22) PCT Filed: Jul. 26, 2022

(86) PCT No.: PCT/EP2022/070957
§ 371 (c)(1),
(2) Date: Feb. 1, 2024

(87) PCT Pub. No.: WO2023/011989
PCT Pub. Date: Feb. 9, 2023

(65) Prior Publication Data
US 2024/0336126 A1   Oct. 10, 2024

(30) Foreign Application Priority Data

Aug. 2, 2021   (DE) ..................... 10 2021 003 958.0

(51) Int. Cl.
*B60K 6/387*   (2007.10)
*F16D 25/0638*   (2006.01)
(Continued)

(52) U.S. Cl.
CPC .......... *B60K 6/387* (2013.01); *F16D 25/0638* (2013.01); *H02K 7/006* (2013.01);
(Continued)

(58) Field of Classification Search
CPC .. B60K 6/387; B60K 2006/4825; B60K 6/48; F16D 25/0638; F16D 13/72; F16D 33/06;
(Continued)

(56) References Cited

U.S. PATENT DOCUMENTS 10,875,399 B2    12/2020   Heeke et al.
2005/0133328 A1*  6/2005   Masuya ................. F16H 45/02
                                              192/3.3
(Continued)

FOREIGN PATENT DOCUMENTS

DE   10 2011 015 376 A1   10/2012
DE   10 2017 219 962 A1    5/2019
(Continued)

OTHER PUBLICATIONS

International Search Report (PCT/ISA/210) issued in PCT Application No. PCT/EP2022/070957 dated Oct. 26, 2022 (2 pages).
(Continued)

*Primary Examiner* — Jacob S. Scott
*Assistant Examiner* — Farhana Pervin
(74) *Attorney, Agent, or Firm* — Crowell & Moring LLP

(57) ABSTRACT

A hybrid drive system for a motor vehicle has an input shaft which is rotatably mounted around an axis of rotation, via which torques provided by an internal combustion machine can be introduced into the hybrid drive system, an output drive shaft arranged coaxially with the input shaft, an electric machine which has a stator and a rotor, and a torque converter which has an impeller, a converter cover connected to the impeller, an interior for receiving oil, and a converter hub which is connected to the converter cover. The (Continued)

converter hub is connected to the rotor in a manner fixed against rotation. The system further has a separable clutch having a disc pack, a clutch chamber in which the disc pack is received, an operating piston, and an associated operating chamber. Via the separable clutch the converter hub can be connected to the input shaft fixed against rotation.

3 Claims, 2 Drawing Sheets

(51) Int. Cl.
 *H02K 7/00* (2006.01)
 *H02K 7/10* (2006.01)
 *H02K 7/108* (2006.01)
 *H02K 9/19* (2006.01)
 *F16D 13/72* (2006.01)
 *F16H 45/02* (2006.01)

(52) U.S. Cl.
 CPC ............... *H02K 7/10* (2013.01); *H02K 7/108* (2013.01); *H02K 9/19* (2013.01); *B60Y 2400/42* (2013.01); *B60Y 2400/426* (2013.01); *F16D 13/72* (2013.01); *F16H 45/02* (2013.01); *F16H 2045/0284* (2013.01)

(58) Field of Classification Search
 CPC .......... F16D 21/08; H02K 7/006; H02K 7/10; H02K 7/108; H02K 9/19; B60Y 2400/42; B60Y 2400/426; F16H 45/02; F16H 2045/0284; F16H 2045/0215; F16H 2045/0221; F16H 57/043; F16H 57/0435; F16H 57/0473; F16H 57/0476
 See application file for complete search history.

(56) References Cited

U.S. PATENT DOCUMENTS

| | | |
|---|---|---|
| 2009/0035129 A1 | 2/2009 | Samie et al. |
| 2010/0072014 A1* | 3/2010 | Heeke .................... B60K 6/365 |
| | | 192/208 |
| 2016/0084363 A1* | 3/2016 | Steinberger ............. F16H 45/00 |
| | | 192/3.28 |
| 2019/0044410 A1* | 2/2019 | Vanni ..................... H02K 7/108 |
| 2019/0190334 A1* | 6/2019 | Payne .................. H02K 1/2791 |
| 2019/0283565 A1* | 9/2019 | Nelson .................... F16D 25/12 |
| 2020/0208723 A1* | 7/2020 | Velthaus ................. F16H 45/02 |
| 2022/0144071 A1* | 5/2022 | Hammond .............. F16H 57/02 |
| 2022/0213950 A1* | 7/2022 | Payne .................. F16D 25/063 |

FOREIGN PATENT DOCUMENTS

| | | |
|---|---|---|
| DE | 10 2018 002 019 A1 | 9/2019 |
| DE | 10 2019 123 491 A1 | 4/2020 |
| DE | 10 2019 001 957 A1 | 9/2020 |

OTHER PUBLICATIONS

German-language Search Report issued in German Application No. 10 2021 003 958.0 dated Apr. 6, 2022, with Statement of Relevancy (7 pages).

U.S. Patent Application, "Hybrid Drive System for a Motor Vehicle", filed Feb. 1, 2024, Inventor Thomas Lechthaler et al.

\* cited by examiner

HYBRID DRIVE SYSTEM FOR A MOTOR VEHICLE

BACKGROUND AND SUMMARY OF THE INVENTION

The invention relates to a hybrid drive system for a motor vehicle, in particular for a motor car.

Such a hybrid drive system for a motor vehicle can, for example, be taken as known from DE 10 2019 001 957 A1. The hybrid drive system has an input shaft which is rotatably mounted around an axis of rotation. Torques which can be provided by an internal combustion m can be introduced into the hybrid drive system via the input shaft. The hybrid drive system additionally comprises an output drive shaft arranged coaxially with the input shaft, and an electric machine, which has a stator and a rotor. The hybrid drive system additionally comprises a torque converter, which has an impeller, a converter cover connected to the impeller in a manner fixed against rotation, an interior intended for receiving oil and which is at least partially and directly delimited by the impeller and a converter hub which is connected to the converter cover in a manner fixed against rotation, which converter hub is connected to the rotor in a manner fixed against rotation. The hybrid drive system additionally comprises a separable clutch, which has a disc pack, a clutch chamber, an operating piston and an associated operating chamber. The disc pack is received in the clutch chamber. By means of the separable clutch, the hub can be connected to the input shaft in a manner fixed against rotation.

In addition, DE 10 2018 002 019 A1 discloses a transmission lubrication valve. A hybrid motor vehicle device is further known from DE 10 2011 015 376 A1.

The object of the invention is to develop a hybrid drive system of the kind specified in the introduction, which can implement a particularly advantageous cooling particularly easily.

To develop a hybrid drive system of the kind specified herein such that a particularly advantageous cooling can be implemented in a particularly simple manner, a cooling oil conduit, also simply described as a cooling conduit, is provided according to the invention, via which cooling oil conduit the disc pack of the separable clutch and the electric machine can be supplied with the oil as cooling oil from the interior of the torque converter, also described as a converter interior or torque converter interior. The cooling oil conduit is designed as a direct connecting conduit between the interior of the torque converter and the clutch chamber of the separable clutch, such that at least a part of the oil received in the interior of the torque converter can be diverted from the interior and introduced into the cooling oil conduit (direct connecting conduit). The oil from the interior of the torque converter diverted from the interior of the torque converter and introduced into the cooling oil conduit can flow through the cooling oil conduit, and is fed to and into the clutch chamber by means of the cooling oil conduit, via which clutch chamber the oil flowing through the cooling oil conduit can be fed out of the interior of the torque converter to the disc pack of the separable clutch and the electric machine, in particular to the rotor and/or the stator, and can thus flow to the disc pack of the separable clutch and the electric machine. The oil from the interior of the torque converter can thus be used as cooling oil, by means of which the disc pack of the separable clutch and the electric machine can be cooled.

It is further provided according to the invention that the cooling oil conduit runs into the converter hub, and is thus introduced into the converter hub. For example, the cooling oil conduit is designed as a hole in the converter hub. Because the cooling oil conduit runs into the converter hub, the cooling oil conduit is directly delimited by the converter hub, i.e., directly by a lateral surface on the internal periphery of the converter hub, such that the oil from the interior of the torque converter flowing through the cooling conduit can directly touch or touches the converter hub, in particular the lateral surface on the internal periphery.

The invention makes it possible to guide oil directly and via a particularly short path from the interior of the torque converter and thus out of the torque converter to the electric machine and the disc pack of the separable clutch, in particular via the clutch chamber, and thus advantageously to use the oil as cooling oil, in order to cool the disc pack of the separable clutch and thus the separable clutch itself, and to cool the electric machine in an easy and advantageous manner.

The following facts and considerations are in particular the basis of the invention: The hybrid drive system can be designed as a P2 hybrid system or form a P2 hybrid system, and can thus be used to implement a P2 arrangement. In such a P2 arrangement, the combustion motor, also described as an internal combustion engine, having the electric machine is arranged on an input of a transmission, also described as a transmission input, into which, for example, the torques provided by the internal combustion engine and torques provided by the electric machine via its rotor can be introduced. The separable clutch is used to de-couple the combustion motor from the rest of the hybrid drive system, i.e., from the converter hub, when the motor vehicle equipped with the hybrid drive system is being driven electrically, such that the electric machine can use its rotor to drive the converter hub, and additionally for example the motor vehicle electrically, in particular purely electrically, without dragging the combustion motor, in particular its output drive shaft, which is for example designed as a crankshaft, along with it. However, to be able to start the internal combustion engine as required, the separable clutch should be able to be power shifted. The combustion motor can thus be towed via the separable clutch, also simply described as a clutch, by means of the electric machine, and can thus be started. When driving in electric mode, it is desirable to cool the rotor and winding heads of the electric machine so that a particularly high continuous output of the electric machine can be achieved. The invention makes it possible to particularly easily feed cooling oil to the electric machine and the separable clutch, in particular to the disc pack of the separable clutch, in different operating modes, for example the previously described electric drive mode and when starting the combustion motor. In other words, the invention makes it possible to feed cooling oil to the electric machine and to the disc pack of the separable clutch as required with simultaneously minimal construction complexity. In principle, it would be conceivable to provide the electric machine and the disc pack of the separable clutch with cooling oil, for example for different operating modes such as the previously specified electric drive mode and when starting the combustion motor, by feeding a separate oil conduit over a driving head housing to the separable clutch, such that cooling oil can be guided via the separate oil conduit. A quantity of the cooling oil to be fed to the separable clutch and to the electric machine can be varied by means of a separate hydraulic unit, which comprises or is an additional valve. However, the separate oil conduit and the hydraulic unit are therefore required, which can lead to a high degree of complexity and to high costs for the hybrid drive system which is also described as a power unit or designed as a power unit.

The previously specified problems and disadvantages can be avoided via the invention. In particular, the invention makes it possible to easily supply the electric machine and the separable clutch with cooling oil from the interior. Because the cooling oil conduit is integrated into the converter hub, a conduit design, via which the electric machine and the separable clutch can be provided with cooling oil, can be integrated into the converter hub near the axle. A quantity of the cooling oil that can be or is fed to the separable clutch, i.e., to the disc pack of the separable clutch, and to the electric machine can for example be implemented via for example a free adjustment or control or regulation of a pressure in the interior of the torque converter and also described as converter internal pressure, in particular a pressure of the oil received in the interior. In other words, the oil, also described as lubricating oil, can be removed from the interior of the torque converter by means of the cooling oil conduit according to the invention, such that the oil from the interior of the torque converter can be used as cooling oil to cool the electric machine and the disc pack. By adjusting, i.e., varying, the pressure of the oil in the interior, the quantity of the cooling oil to be fed to the electric machine and the disc pack can for example be adjusted as required. In particular, a sufficient supply of oil to the separable clutch and of the disc clutch can be guaranteed, and in a particularly simple, and thus cost-effective manner. It is conceivable that an aperture is used, via which for example the electric machine and the disc pack of the separable clutch can be provided with the oil from the interior of the torque converter. A closing option can be implemented using a spring force-operated return valve. In other words, it is conceivable that the disc pack of the separable clutch and the electric machine can be supplied with the cooling oil via a spring force-operated return valve, whereby for example the return valve opens in the direction of the disc pack of the separable clutch and in the direction of the electric machine and closes in the opposite direction, and thus avoids a flow of the oil through the cooling oil conduit in the direction of the converter interior. The return valve is preferably designed as an integrated ball valve. In other words, it is preferably provided that the return valve is arranged in the cooling oil conduit, and thus in the converter hub. A closing option can further be achieved by an adjusted pressure level in the converter interior, in particular depending on the selected spring rigidity of the return valve.

An excessively complex conduit design in a power head housing is also not required due to the present invention, nor is a separate hydraulic control system. A variability of the quantity of the cooling oil to be fed to the electric machine and to the disc pack of the separable clutch can be guaranteed, for example via the freely adjustable converter internal pressure, which can in particular be freely regulated. The potentially provided, integrated ball valve can make it possible to close the cooling oil conduit, also described as a cooling oil line or designed or functioning as a cooling oil line, below a certain system pressure, and thus, for example, to avoid a flow of the oil back through the cooling oil conduit in the direction of the converter interior. This can prevent the hybrid drive system, also described as a hybrid unit, i.e., at least one region of the hybrid drive system, from being undesirably flooded with cooling oil in states in which the possibility of returning the cooling oil is reduced.

In an advantageous embodiment of the invention, a valve device is arranged in the cooling oil conduit, by means of which valve device a quantity of the cooling oil to be fed to the disc pack and the electric machine can be adjusted. For example, the valve device can be the previously described return valve. The cooling oil can thus in particular be guided directly and via a particularly short path from the torque converter to the separable clutch and to the electric machine, because the valve device does not sit in a separate electro-hydraulic control unit, and instead sits directly in the cooling oil conduit.

In a further embodiment of the invention, the input shaft has a radial drawing device on its end in the transmission, and thus for example the end pointing towards or facing the torque converter, which has an external diameter which is smaller than an internal diameter of the converter hub, wherein a bearing, for example designed as a rolling bearing, via which the converter hub is rotatably mounted on the input shaft, in particular on the radial drawing device, has a bearing external diameter which is in particular smaller than a diameter on which the cooling oil conduit is arranged. An unimpeded flow of the cooling oil, in particular to the clutch chamber of the separable clutch, is thus achieved, and a solution is found which is optimal for installation space.

Further advantages, features and details of the invention result from the following description of a preferred exemplary embodiment and with reference to the drawings. The features and combinations of features previously specified in the description and the features and combinations of features specified in the following description of figures and/or shown only in the figures can be used not only in the specified combination, but also in other combinations or in isolation without leaving the scope of the invention.

DETAILED DESCRIPTION OF THE DRAWINGS

Figure 1:
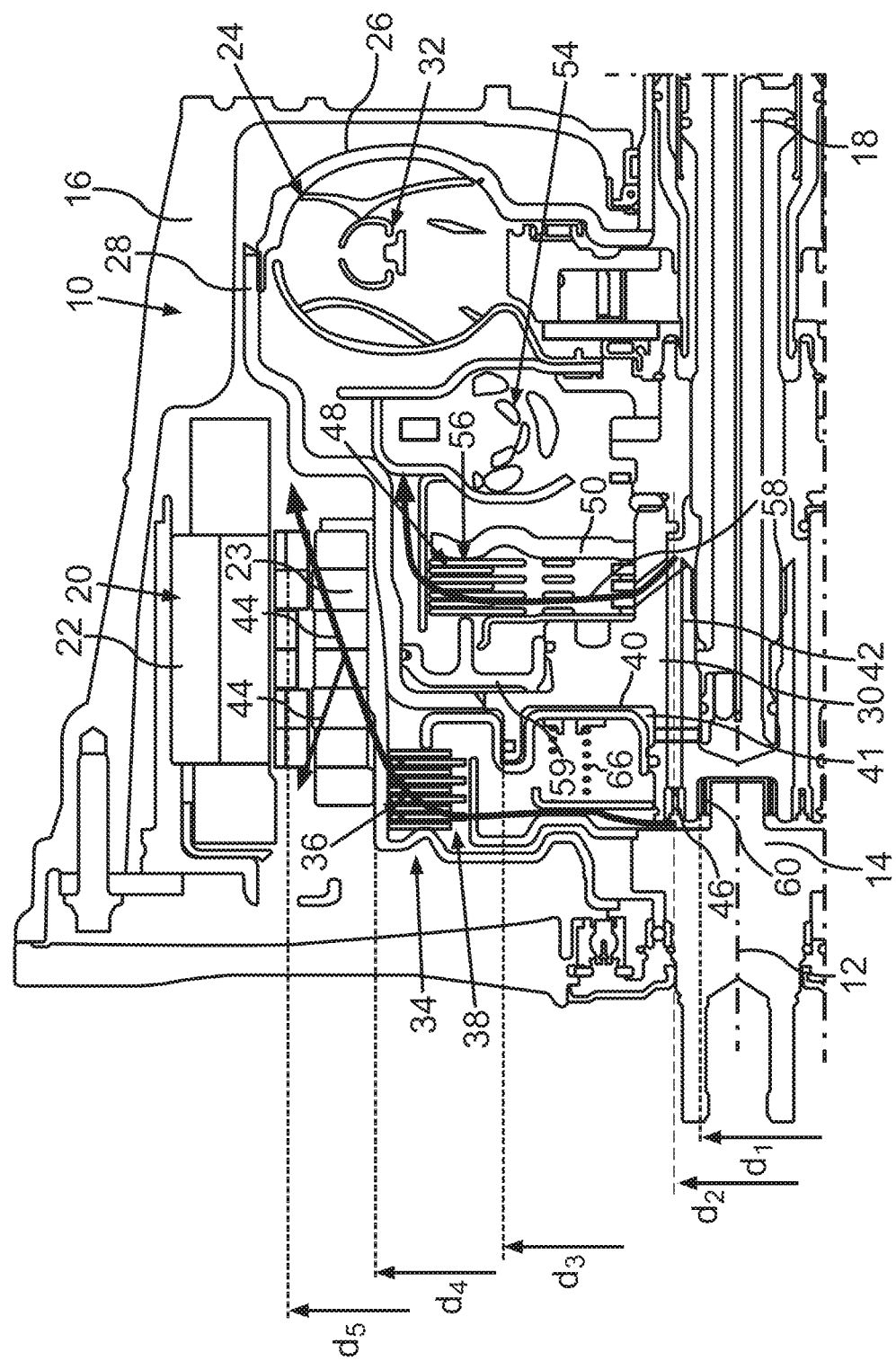
FIG. 1 shows a section of a schematic and sectional side view of a hybrid drive system for a motor vehicle, in particular for a motor car.

In the Figures, identical or functionally identical elements are provided with identical reference numerals.

FIG. 1 show a section of a hybrid drive system 10, also described as a power unit or designed as a power unit, for a motor vehicle, in particular for a motor car in a schematic and sectional side view. The hybrid drive system 10 has an input shaft 14 which is rotatably mounted around an axis of rotation 12 and which can be rotated around the axis of rotation 12 relative to a housing 16 of the hybrid drive system 10. Torques which can be provided by an internal combustion engine (not depicted in the figures) can be introduced into the hybrid drive system 10 via the input shaft 14. The internal combustion engine can optionally be a component of the hybrid drive system 10. In its completely produced state, the motor vehicle has the hybrid drive system 10 and the internal combustion engine, wherein the motor vehicle can be driven by means of the internal combustion engine.

The hybrid drive system 10 comprises an output drive shaft 18 which is arranged coaxially with the input shaft 14 and which can be rotated around the axis of rotation 12 relative to the housing 16. Via the output drive shaft 18, the hybrid drive system 10 can provide torques, which are also described as drive moments and for example can be introduced into a transmission (not depicted in FIG. 1) of the drivetrain of the motor vehicle. The hybrid drive system 10 further comprises an electric machine 20, which has a stator 22 and a rotor 23. The rotor 23 is arranged coaxially with the input shaft 14 and coaxially with the output drive shaft 18, and can thus be rotated around the axis of rotation 12 relative to the housing 16 and relative to the stator 22. Via its rotor 23, the electric machine 20 can provide torques, in particular for driving the motor vehicle purely electrically. The previously specified drive torques, which can be provided by the hybrid drive system 10 via the output drive shaft 18, result for example from the torques provided by the internal combustion engine and/or the electric machine 20. In particular, the rotor 23 can be driven by means of the stator 22, and can thus be rotated around the axis of rotation 12 relative to the housing 16.

The hybrid drive system 10 additionally comprises a torque converter 24, which is presently designed as a hydrodynamic torque converter. The torque converter 24 has an impeller 26, a converter cover 28 connected to the impeller 26 in a manner fixed against rotation and a converter hub 30, also simply described as a hub, which is connected to the converter cover in a manner fixed against rotation. In addition, the converter hub 30 is connected to the rotor 23 in a manner fixed against rotation. In the exemplary embodiment shown in FIG. 1, the converter hub 30 is connected to the rotor 23 in a manner fixed against rotation via the converter cover 28, such that the rotor 23 is connected to the converter cover 28 in a manner fixed against rotation, and the converter cover 28 is connected to the converter hub 30 in a manner fixed against rotation. The torque converter 24 further has an interior 32, also described as a converter interior, which is at least partially and directly delimited by the impeller 26. In the interior 32 (converter interior), an oil also described as lubricating oil can be received. In other words, oil is for example received in the converter interior during an operation of the hybrid drive system 10.

The hybrid drive system 10 additionally comprises a separable clutch 34, also described as K0 or labelled with K0, which has a disc pack 36 and a clutch chamber 38, in which the disc pack 36 is received. The separable clutch 34 designed as a disc clutch additionally comprises an operating piston 40, which can be moved, in particular in the axial direction of the separable clutch 34, relative to the disc pack 36, in particular translationally. The separable clutch 34 is arranged coaxially with the input shaft 14 and coaxially with the output drive shaft 18, such that the axial direction of the separable clutch 34 coincides with the axial direction of the input shaft 14 or the output drive shaft 18. The separable clutch 34 further has an operating chamber 41 belonging to the operating piston 40. A hydraulic fluid can be introduced into the operating chamber 41, whereby, for example, the hydraulic fluid can be applied to the operating piston 40 at least indirectly, in particular directly, thereby moving the operating piston from a decoupled position into a coupled position, in particular in the axial direction of the separable clutch 34 and/or relative to the disc packet 36. The disc pack 36 can thus be pressed together by means of the operating piston 40, whereby for example the initially open separable clutch 34 can be closed. If the separable clutch 34 is open, the converter hub 30 (hub) can be rotated around the axis of rotation 12 relative to the input shaft 14, such that the input shaft 14 is decoupled from the converter hub 30 or vice versa. If, however, the separable clutch 34 is closed, the converter hub 30 is connected to the input shaft 14 by means of the separable clutch 34 in a manner fixed against rotation, such that the converter hub 30 can then be driven via the separable clutch 34 by the input shaft 14, and thus by the internal combustion engine.

When the motor vehicle is being driven electrically, the separable clutch 34 is for example open, such that via its rotor 23, the electric machine 20 can drive the converter cover 28, and additionally the converter hub 30 and thus the motor vehicle, electrically, in particular purely electrically, without dragging the internal combustion engine, in particular its output drive shaft, for example designed as a crankshaft, along with it. For example, in order to start, i.e., to tow, the initially deactivated internal combustion engine by means of the electric machine 20, the separable clutch 34 is closed. Via its rotor 23, the electric machine 20 can then specifically drive the converter cover 28, and additionally the converter hub 30, and thus drive the input shaft 14 and thus the internal combustion engine or its output drive shaft via the separable clutch 34.

To be able to implement a particularly advantageous cooling of the electric machine 20 and of the disc pack 36 in a particularly easy manner, the hybrid drive system 10 has a cooling oil conduit 42 designed as a direct connecting conduit between the interior 32 of the torque converter 24 and the clutch chamber 38 of the separable clutch 34, and running into the converter hub 30, via which cooling oil conduit the disc pack 36, the separable clutch 34 and the electric machine 20, in particular the rotor 23 and/or the stator 22, can be supplied with the oil as cooling oil from the interior 32 of the torque converter 24. In FIG. 1, a flow of the oil used as cooling oil from the converter interior through the cooling oil conduit 42 and to the disc pack 36 and the electric machine 20 is depicted by arrows 44. It can in particular be seen using the arrows 44 that the oil from the converter interior can be fed to the disc pack 36 and to the electric machine 20 directly and via a particularly short path, and can thus be used as cooling oil, by means of which the disc pack 36 and the electric machine 20 can be advantageously cooled.

In particular during the previously specified operation of the hybrid drive system 10, there is also a pressure, described as internal pressure or converter interior pressure, in the converter interior, in particular a pressure of the oil received in the converter interior. By adjusting, and thus varying, the converter interior pressure, a quantity of the cooling oil which is fed to the disc pack 36 and the electric machine 20 can for example be varied as required.

Figure 2:
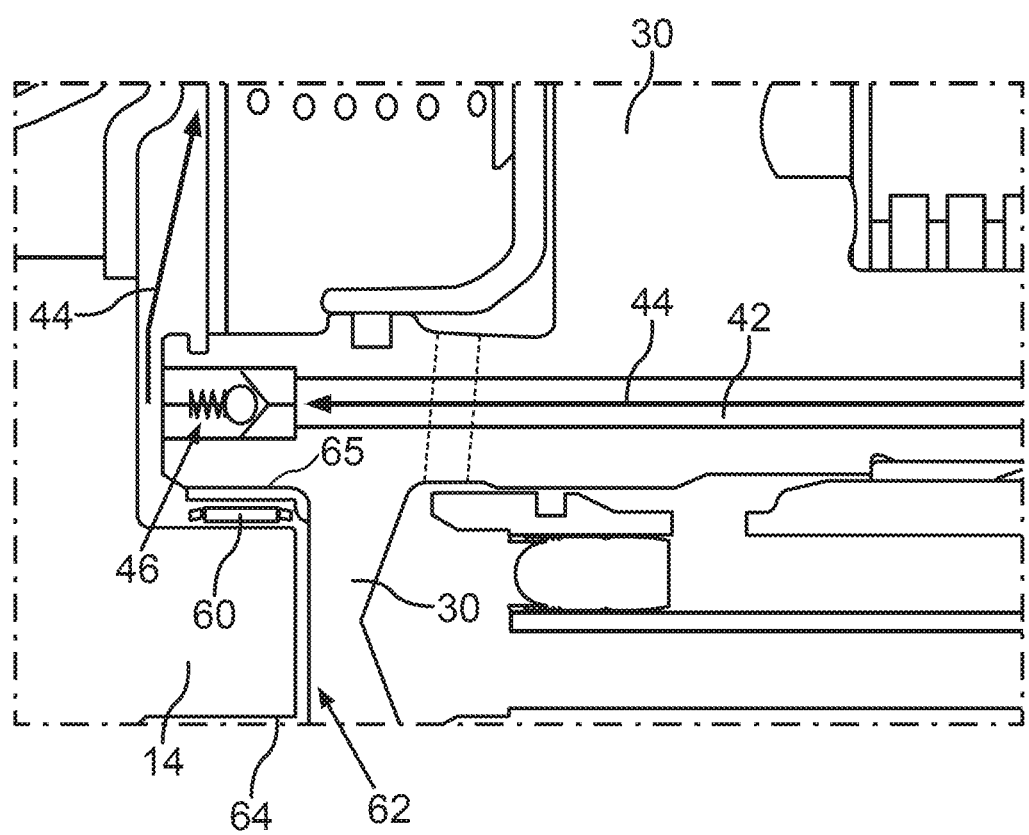
FIG. 2 shows a section of a further schematic and sectional side view of the hybrid drive system.

It can be seen from FIG. 2 that a valve device 46, for example designed as a return valve, can be arranged in the cooling oil conduit 42, and thus in the converter hub 30, by means of which valve device, for example, the quantity of the cooling oil to be fed to the disc pack 36 and to the electric machine 20 can be adjusted. In the exemplary embodiment shown in FIG. 2, the valve device 46 is designed as a spring-loaded return valve, and in this case as a spring-loaded ball valve, wherein the return valve opens in the direction of the disc pack 36 and of the electric machine 20, and blocks in the opposite direction, and thus in the direction of the converter interior. This means that the cooling oil, of which the flow is also depicted in FIG. 2 by the arrows 44, can indeed flow through the cooling oil conduit 42, and through the return valve and to the disc pack 36, and to the electric machine 20, so that the return valve permits a flow of the cooling oil through the cooling oil conduit 42 to the disc pack 36 and the electric machine 20, but the return valve prevents a flow of the cooling oil through the cooling oil conduit 42 in the direction of the converter interior. The valve device 46 is arranged in the converter hub 30, and is thus integrated into the converter hub 30, such that a particularly simple and cost-effective design of the hybrid drive system 10 can be created.

The valve device 46, which is preferably designed as a spring-loaded ball valve, preferably has an integrated aperture, via which the disc pack 36 and the electric machine 20 can be provided with the cooling oil.

It can be seen from FIG. 1 that the hybrid drive system 10 has a second clutch 48, which is presently designed as a wet clutch, i.e., as a wet running clutch. The second clutch 48, designed as a disc clutch, has a first inner disc carrier 50, which is connected to the converter hub 30 in a manner fixed against rotation. An outer disc carrier 52 of the second clutch 48 is connected to the output drive shaft 18 in a torque-transmitting manner via a torsional vibration damper 54, such that the converter hub 30 can be connected to the output drive shaft 18 in a torque-transmitting manner by means of the second clutch 48. The second clutch 48 functions as a converter bridging clutch to bridge the torque converter 24. The second clutch 48 has a second disc pack 56 and a second operating piston 59, by means of which the second disc pack 56 can be pressed together, in order thus to close the second clutch 48.

It can be seen from FIG. 1 that the disc pack 56 of the second clutch 48 can also be supplied with oil as cooling oil from the converter interior via the cooling oil conduit 42 running into the converter hub 30, which is represented in FIG. 1 by an arrow 58. For this purpose, the cooling oil conduit 42 also leads into a second clutch chamber of the second clutch 48, in the second clutch chamber of which the second disc pack 56 is received In FIG. 1, respective diameters, in particular external diameters, are labelled $d_1$, $d_2$, $d_3$, $d_4$ and $d_5$. The diameter $d_1$ is a diameter, in particular an external diameter, of a bearing 60, also described as a pilot bearing and for example designed as a roller bearing, which can be seen particularly clearly from FIG. 2. The input shaft 14 has a radial drawing device 64 on its end 62 on the transmission side and facing the torque converter 42, on which drawing device the bearing 60 is arranged. An internal diameter 65 of the converter hub 30 is smaller in an axial region of the drawing device 64 than an external diameter of the radial drawing device 64, such that the bearing 60 can be arranged between the radial drawing device 64 and the internal diameter 65 of the converter hub 30. Via the bearing 60, the converter hub 30 is thus rotatably mounted on the drawing device 64, and on the input shaft 14. The diameter $d_2$ is a diameter of the cooling oil conduit 42, also simply described as an oil conduit, which is for example arranged on the diameter $d_2$. The diameter $d_3$ is for example a diameter of a piston chamber, in which for example the operating piston 40 is arranged. The diameter da is for example a diameter of the disc pack 36 or of discs of the disc pack 36 of the separable clutch 34. The diameter $d_5$ is for example a diameter of the rotor 23. In particular using the diameters $d_{1-5}$, a radial nesting of the pilot bearing, of the valve device 46, of the cooling oil conduit 42, of the operating piston 40, of a return spring 66 for pushing back the operating piston 40, and thus for example to open the separable clutch 34, the discs of the separable clutch 34, the rotor 23 and the stator 22 can be seen to generate axial installation space advantages. The pilot bearing is small, and thus has installation space advantages, functional advantages and cost advantages, with the functional advantages consisting in particular of a particularly low peripheral speed of the pilot bearing. The following diameter ratios are presently provided: $d_5 \gg d_4 > d_3 > d_2 > d_1$.

Due to the piston chamber ($d_3 < d_5$) arranged particularly close to the axle, a centrifugal oil compensation can be maintained in spring forces of the return spring 66 despite compliance with a requirement, and a centrifugal cap is not required. The arrangement of the cooling oil conduit 42 ($d_2 \ll d_5$) close to the axle leads to an advantageous cooling oil distribution due to centrifugal force in a rotating operation and low centrifugal forces (friction, hysteresis) on cooling-oil-controlling valves or apertures, e.g., the valve device 46. The cooling-oil-guiding converter hub 30 and slide elements or the valve device 46 can be formed from the same material, so that they fit together independent of temperature.

The invention claimed is:

1. A hybrid drive system (10) for a motor vehicle, comprising:
    an input shaft (14) which is rotatably mounted around an axis of rotation (12) and via which torques provided by an internal combustion engine are introducible into the hybrid drive system (10);
    an output drive shaft (18) disposed coaxially with the input shaft (14);
    an electric machine (20) which has a stator (22) and a rotor (23);
    a torque converter (24) which has an impeller (26), a converter cover (28) connected to the impeller (26) in a manner fixed against rotation, an interior (32) for receiving oil and which is at least partially and directly delimited by the impeller (26), and a converter hub (30) which is connected to the converter cover (28) in a manner fixed against rotation, wherein the converter hub (30) is connected to the rotor (23) in a manner fixed against rotation;
    a separable clutch (34) having a disc pack (36), a clutch chamber (38) in which the disc pack (36) is received, an operating piston (40), and an associated operating chamber (42); and
    a cooling oil conduit (42) that is a direct connecting conduit between the interior (32) of the torque converter (24) and the clutch chamber (38) of the separable clutch (34) and runs within the converter hub (30), wherein via the cooling oil conduit (42) the disc pack (36) of the separable clutch (34) and the electric machine (20) are suppliable with the oil as cooling oil from the interior (32) of the torque converter (24).

2. The hybrid drive system (10) according to claim 1, further comprising a valve device (46) disposed in the cooling oil conduit (42), wherein via the valve device (46) a quantity of the cooling oil to be fed to the disc pack (36) and the electric machine (20) is adjustable.

3. The hybrid drive system (10) according to claim 1, wherein the input shaft (14) has a radial drawing device (64) on an end (62), wherein the drawing device (64) has an external diameter which is smaller than an internal diameter (65) of the converter hub (30) in an axial region of the drawing device (64), and wherein a bearing (60), via which the converter hub (30) is rotatably mounted on the input shaft (14), has a bearing external diameter ($d_1$) which is smaller than a diameter ($d_2$) on which the cooling oil conduit (42) is disposed.

* * * * *